US006604542B1

(12) United States Patent
Bircann et al.

(10) Patent No.: US 6,604,542 B1
(45) Date of Patent: Aug. 12, 2003

(54) MODULAR EXHAUST GAS RECIRCULATION VALVE

(75) Inventors: Raul A. Bircann, Penfield, NY (US); Dwight O. Palmer, Rochester, NY (US)

(73) Assignee: Delphi Technologies, Inc., Troy, MI (US)

( * ) Notice: Subject to any disclaimer, the term of this patent is extended or adjusted under 35 U.S.C. 154(b) by 281 days.

(21) Appl. No.: 09/721,257

(22) Filed: Nov. 22, 2000

Related U.S. Application Data

(60) Provisional application No. 60/184,745, filed on Feb. 24, 2000.

(51) Int. Cl.[7] ................................................ F16K 31/02

(52) U.S. Cl. .................. 137/269; 137/271; 251/129.07; 123/568.21

(58) Field of Search ................................ 137/269, 271; 251/129.07, 129.15; 123/568.21

(56) References Cited

U.S. PATENT DOCUMENTS

| | | | | | |
|---|---|---|---|---|---|
| 3,747,623 | A | * | 7/1973 | Greenwood et al. | 137/269 |
| 4,662,604 | A | * | 5/1987 | Cook | 251/129.07 |
| 4,725,040 | A | | 2/1988 | Fornuto et al. | |
| 4,742,989 | A | * | 5/1988 | Akagi | 251/129.05 |
| 4,805,582 | A | * | 2/1989 | Braun et al. | 251/129.15 |
| 4,961,413 | A | * | 10/1990 | Grey et al. | 251/129.15 |
| 5,020,505 | A | * | 6/1991 | Grey et al. | 251/129.2 |
| 5,022,431 | A | | 6/1991 | Grey et al. | |
| 5,199,456 | A | * | 4/1993 | Love et al. | 137/269 |
| 5,435,519 | A | * | 7/1995 | Everingham | 251/129.15 |
| 5,467,962 | A | * | 11/1995 | Bircann et al. | 251/129.15 |
| 5,701,874 | A | | 12/1997 | Sari et al. | |
| 5,901,940 | A | * | 5/1999 | Hussey et al. | 251/129.15 |
| 6,116,224 | A | * | 9/2000 | Cook et al. | 123/568.27 |
| 6,178,956 | B1 | * | 1/2001 | Steinmann et al. | 251/129.07 |

FOREIGN PATENT DOCUMENTS

| | | |
|---|---|---|
| DE | 19721993 | 5/1997 |
| DE | 19752495 | 11/1997 |
| EP | 0137282 | 8/1984 |
| EP | 0461688 | 5/1991 |
| WO | WO 99/18344 | 4/1999 |

OTHER PUBLICATIONS

European Search Report—01200548.4-2311—Jul. 15, 2002.

* cited by examiner

*Primary Examiner*—Ehud Gartenberg
*Assistant Examiner*—John Bastianelli
(74) *Attorney, Agent, or Firm*—Patrick M. Griffin

(57) ABSTRACT

A modular EGR valve includes an actuator subassembly and a metering subassembly. The metering subassembly defines a metering port and a metering chamber. The metering port and the metering chamber have a predetermined relative configuration. The metering subassembly is configured for being coupled to the actuator subassembly and for being coupled to an engine.

21 Claims, 5 Drawing Sheets

MODULAR EXHAUST GAS RECIRCULATION VALVE

CROSS REFERENCE TO RELATED APPLICATIONS

The present invention claims the benefit of U.S. Provisional Patent Application No. 60/184,745, filed Feb. 24, 2000.

TECHNICAL FIELD

The present invention relates to exhaust gas recirculation valves for use with internal combustion engines.

BACKGROUND OF THE INVENTION

Exhaust gas recirculation (EGR) valves capture engine exhaust and selectively recycle the captured exhaust gas into the combustion chamber of the engine. Adding the exhaust gas to the air in the combustion chamber increases fuel economy and reduces undesirable emissions.

Conventional EGR valves include a magnetic actuator and a metering body. The actuator includes an elongate shaft. The metering body includes a metering chamber having a metering port. The metering chamber has an end that is associated with the intake manifold or intake vacuum of the engine. The metering port is connected to a source of exhaust gas and provides a passageway for the flow of exhaust gas into the metering chamber. The shaft extends contiguously in an axial direction from the actuator, through an orifice in the metering body, into the metering chamber, and through the metering port. An enlarged end of the shaft is disposed proximate the metering port. In a default position, the enlarged end of the shaft sealingly engages the metering port and prevents exhaust gas from entering the metering chamber. The metering port is opened when the shaft is disengaged or reciprocated from sealing engagement therewith, thereby allowing exhaust gas to enter into the metering chamber. Thus, the metering port and the reciprocal motion of the shaft selectively provide a passageway for exhaust gas to enter into the metering chamber and into the intake air stream of the engine.

EGR valves are designed for use with a particular engine. The EGR valve is bolted or otherwise attached to the engine, typically at the metering body. Different engines will typically have different mounting configurations to accommodate EGR valves. The EGR valve must be specifically designed with a metering body that mates with the mounting configuration of that particular engine model. Thus, an EGR valve designed for a particular model of engine will not likely be interchangeable with an EGR valve designed for use with a different model of engine. Furthermore, even if mounting configurations are standardized, different engine models typically require different relative configurations of the metering chamber and the metering port. Thus, each different type or model of engine typically requires an EGR valve that is designed specifically for use with that engine. Therefore, a supplier of EGR valves must have the capability to manufacture numerous and distinct designs of EGR valves for use with the different engine models.

Manufacturing numerous and distinct designs of EGR valves requires a manufacturer to maintain multiple manufacturing lines, multiple manufacturing processes, and design-specific tooling, thereby increasing the cost and resources required to manufacture each EGR valve. Component parts for each EGR valve design must be ordered, stored, and inventoried, thereby further increasing the cost and resources required to manufacture multiple designs of EGR valves. Furthermore, maintaining an inventory of EGR valves for use with each different type of engine results in substantially increased overhead costs for, and consumes the valuable floor space of, automobile manufacturers, parts suppliers, and repair shops.

Therefore, what is needed in the art is a modular EGR valve which can be used with a number of different models of engines.

Furthermore, what is needed in the art is an EGR valve design which reduces the number of component parts, number of manufacturing processes, and different tooling required to manufacture the valve.

SUMMARY OF THE INVENTION.

The present invention provides a modular EGR valve for use with a plurality of internal combustion engines.

The present invention comprises, in one form thereof, an actuator subassembly and a metering subassembly. The metering subassembly defines a metering port and a metering chamber. The metering port and the metering chamber have a predetermined relative configuration. The metering subassembly is configured for being coupled to the actuator subassembly and for being coupled to an engine.

An advantage of the present invention is that the different metering subassemblies can be used with corresponding and different models of engines.

Another advantage of the present invention is that a common actuator subassembly is coupled to each of the different metering subassemblies, and thus only one actuator subassembly is required.

Yet another advantage is that the modular construction of the EGR valve reduces scrap and expedites repair procedures.

BRIEF DESCRIPTION OF THE DRAWINGS

The above-mentioned and other features and advantages of this invention, and the manner of attaining them, will become more apparent and the invention will be better understood by reference to the following description of an embodiment of the invention taken in conjunction with the accompanying drawings, wherein.

Figure 1:
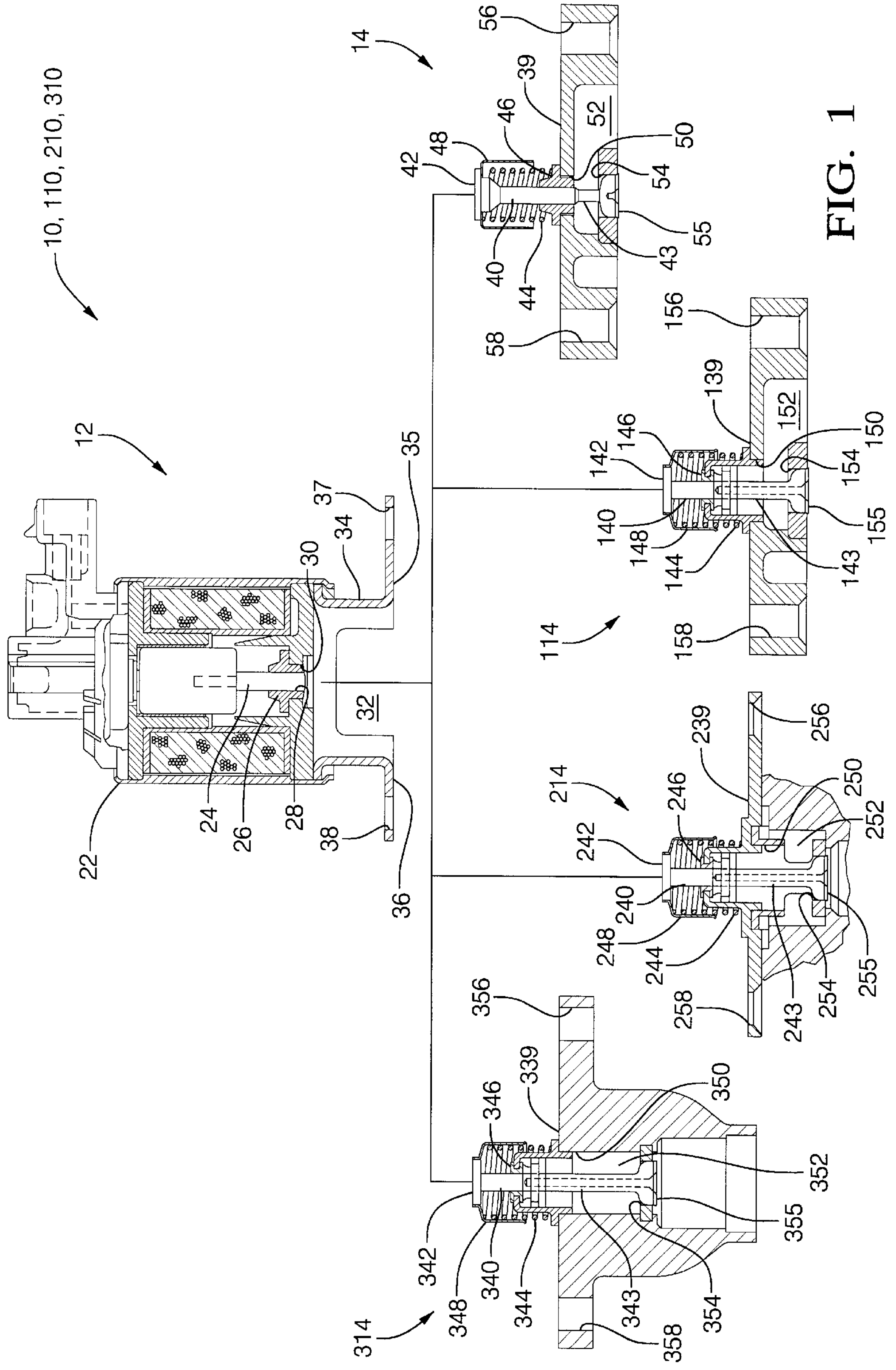
FIG. 1 is an exploded, partially sectioned view of four embodiments of the modular EGR valve of the present invention.
Figure 2:
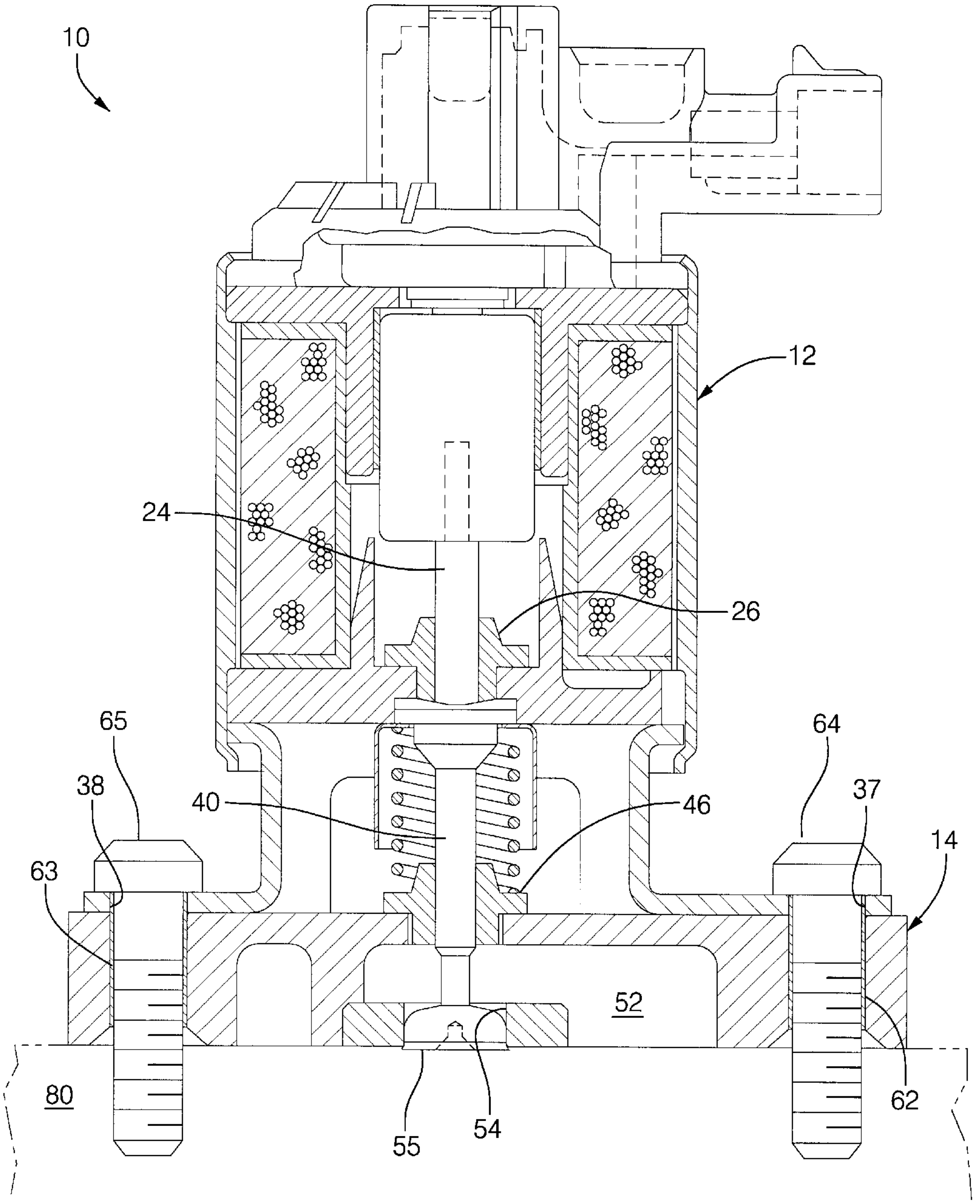
FIG. 2 is a partially sectioned view of a first embodiment of the modular EGR valve of the present invention.
Figure 3:
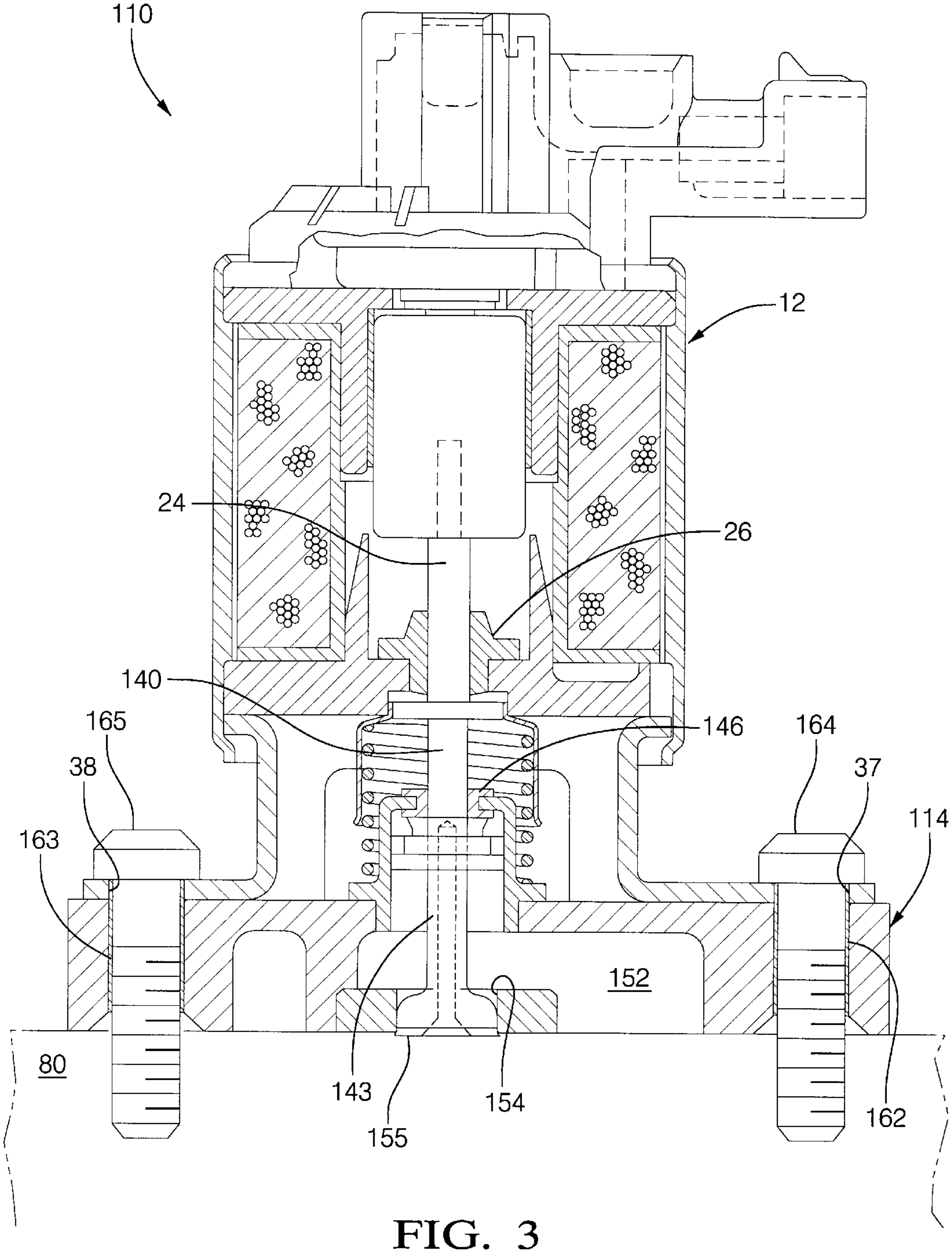
FIG. 3 is a partially sectioned view of a second embodiment of the modular EGR valve of the present invention.
Figure 4:
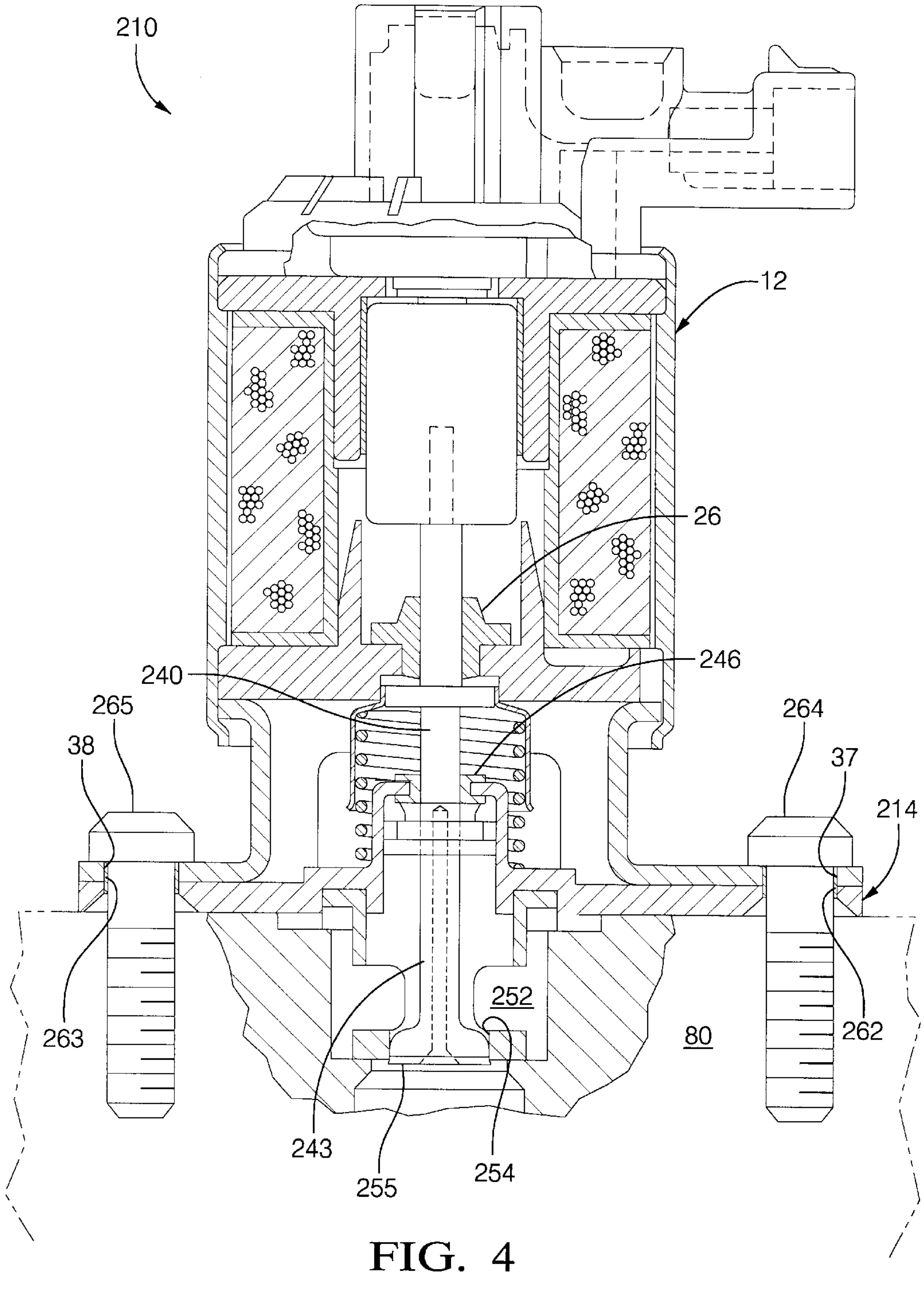
FIG. 4 is a partially sectioned view of a third embodiment of the modular EGR valve of the present invention.
Figure 5:
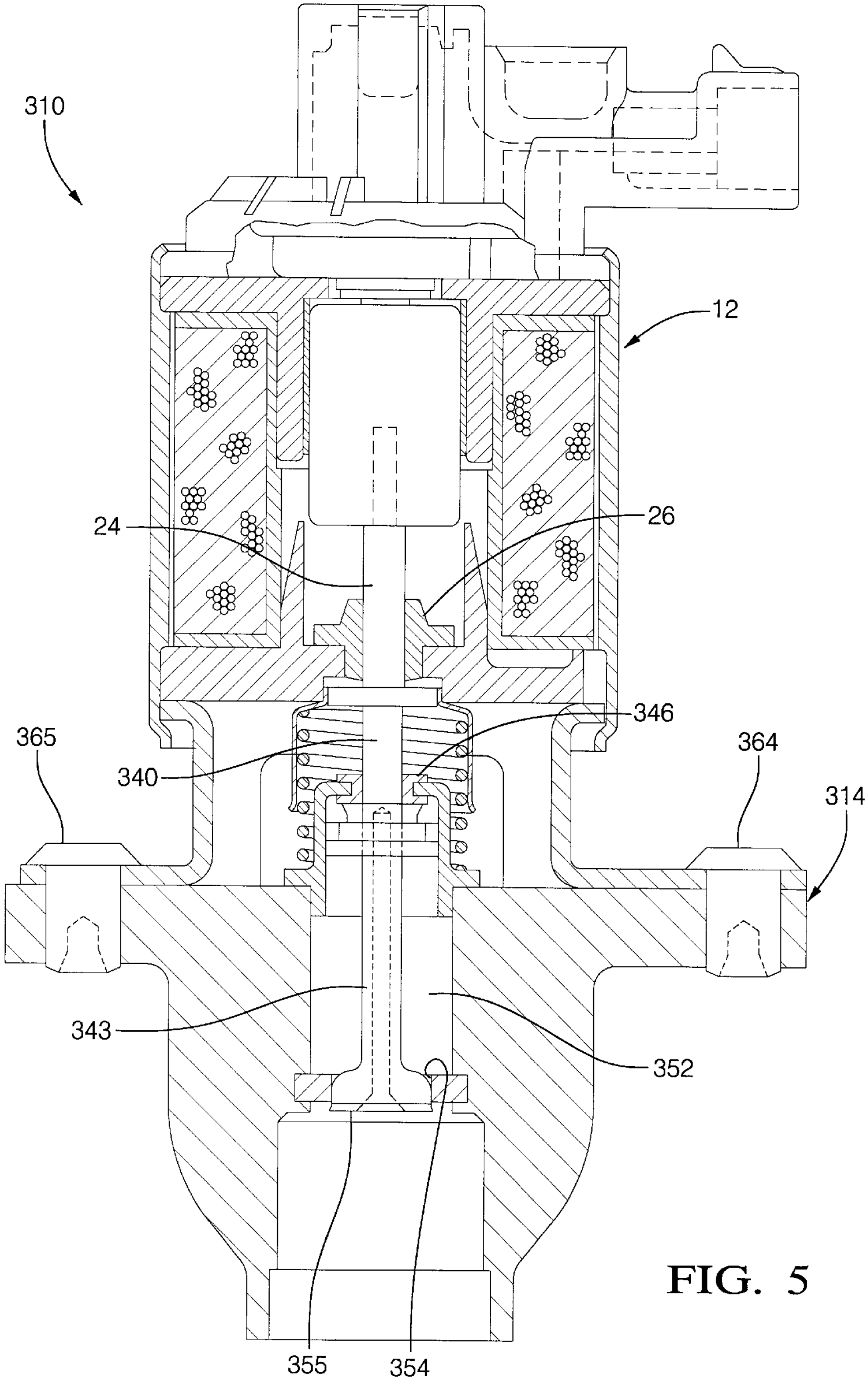
FIG. 5 is a partially sectioned view of a fourth embodiment of the modular EGR valve of the present invention.

Corresponding reference characters indicate corresponding parts throughout the several views. The exemplifications set out herein illustrates one preferred embodiment of the invention, in one form, and such exemplifications are not to be construed as limiting the scope of the invention in any manner.

DESCRIPTION OF THE PREFERRED EMBODIMENT

With reference to the drawings, and particularly to FIG. 1, there is shown four embodiments of a modular exhaust gas recirculation (EGR) valve of the present invention. Modular EGR valves 10, 110, 210 and 310 include actuator subassembly 12 and a selected one of metering subassemblies 14, 114, 214 or 314. As will be more particularly described hereinafter, actuator subassembly 12 is coupled to a selected one of metering subassemblies 14, 114, 214 and 314 to thereby form one of modular EGR valves 10, 110, 210 and 310. The selection of a particular metering subassembly 14, 114, 214 and 314 to be used is determined based at least in part upon the engine upon which modular EGR valve 10 is to be installed.

Actuator subassembly 12 includes actuator 22. Actuator 22 includes actuator shaft 24, which is disposed within actuator 22 and extends longitudinally into bearing 26 seated in actuator orifice 28. Actuator shaft 24 terminates proximate with lower surface 30 of actuator bearing 26, although it is to be understood that actuator shaft 24 can alternately configured, such as, for example, to terminate below or within lower surface 30. Actuator 22 includes a lower cylindrical cavity 32 defined by lower actuator wall 34. Lower actuator wall 34 includes two radially-projecting mounting flanges 35 and 36, each of which define cylindrical actuator mounting bores 37 and 38, respectively, therethrough. Actuator 22 is configured to be coupled to each of metering subassemblies 14, 114, 214 and 314. Actuator shaft 24 is disposed proximate to and substantially concentric with cavity 32.

Each of metering subassemblies 14, 114, 214 and 314 include a respective metering body 39, 139, 239 and 339, and a respective metering shaft 40, 140, 240 and 340. Each respective metering shaft 40, 140, 240 and 340 is terminated at a first end with a corresponding flange 42, 142, 242 and 342. Each metering shaft 40, 140, 240 and 340 extends through a corresponding metering bearing 46, 146, 246, 346 and is coupled to a respective poppet 43, 143, 243, 343. Each of springs 44, 144, 244 and 344 exert an axially-directed force upon and bias a respective shield 48, 148, 248, 348 against a corresponding flange 42, 142, 242, 342. Each flange 42, 142, 242, 342 is disposed external to and axially above a corresponding metering body 39, 139, 239 and 339.

Each poppet 43, 143, 243, 343 is coupled at a first end to a corresponding metering shaft 40, 140, 240, 340, and extends axially through a corresponding orifice 50, 150, 250, 350 in metering body 39, 139, 239, 339, respectively, through a corresponding metering chamber 52, 152, 252, 352, and into a corresponding metering port 54, 154, 254, 354. Each poppet 43, 143, 243, 343 is terminated at a second end with an enlarged plunger-shaped end 55, 155, 255, 355, each of which is normally disposed in sealing engagement with a respective metering port 54, 154, 254, 354.

Each respective metering body 39, 139, 239, 339 defines respective mounting bores 56, 156, 256, 356 and 58, 158, 258, 358 therethrough, which are spaced apart such that they will mate with actuator mounting bores 37 and 38, respectively. Thus, any one of metering subassemblies 14, 114, 214, 314 may be attached or coupled to actuator subassembly 12 by, for example, bolts, eyelets or other suitable fasteners.

Each of metering ports 54, 154, 254, 354 and metering chambers 52, 152, 252, 352, respectively, have a predetermined relative configuration that is different in each metering subassembly 14, 114, 214 and 314. Yet, as stated above, any one of metering subassemblies 14, 114, 214, 314 may be attached or coupled to actuator subassembly 12. Thus, actuator subassembly 12 is configured to be coupled to a plurality of metering subassemblies 14, 114, 214, 314 which, in turn, each have a different predetermined configuration of metering ports 54, 154, 254, 354 and metering chambers 52, 152, 252, 352, respectively, relative to each other. Each of metering subassemblies 14, 114, 214, 314 are designed for a particular engine or engine model. One of metering subassemblies 14, 114, 214, 314 is selected based at least in part upon the engine model with which the resulting modular EGR valve will be used. The selected one of metering subassemblies 14, 114, 214, 314 is coupled to the engine, and to actuator subassembly 12. Thus, a single actuator subassembly is used in a plurality of modular EGR valves 10, 110, 210 and 310, and with a plurality of different engine models.

As stated above, the predetermined relative configuration of metering ports 54, 154, 254, 354 and metering chambers 52, 152, 252, 352, respectively, is different within each metering subassembly 14, 114, 214 and 314. More particularly, metering subassembly 14 is configured as an integral base non-pressure balanced valve metering subassembly; metering subassembly 114 is configured as an integral base pressure balanced valve metering subassembly; metering subassembly 214 is configured as a seat tube valve metering subassembly; and metering subassembly 314 is configured as a 90 degree valve metering subassembly which may be pressure balancing or non-pressure balancing.

Referring now to FIGS. 2–5, each metering subassembly 14, 114, 214, 314 is shown attached to a respective actuator subassembly 12. More particularly, metering subassembly 14 is attached to a respective actuator subassembly 12 to thereby form modular EGR valve 10; metering subassembly 114 is attached to a respective actuator subassembly 12 to thereby form modular EGR valve 110; metering subassembly 214 is attached to a respective actuator subassembly 12 to thereby form modular EGR valve 210; and metering subassembly 314 is attached to a respective actuator subassembly 12 to thereby form modular EGR valve 310.

Metering subassemblies 14, 114 and 214 are attached by eyelets 62, 63, 162, 163, and 262, 263, respectively, to a corresponding actuator subassembly 12. Eyelets 62, 63, 162, 163, and 262, 263 are constructed of, for example, stainless steel or aluminum. Metering subassembly 314 is attached by rivets 364 and 365, constructed of, for example, stainless steel or aluminum, to a corresponding actuator subassembly 12. Eyelets 62, 162, 262 and 63, 163, 263 are used to hold metering subassemblies 14, 114 and 214, respectively, to a corresponding actuator subassembly 12 during, for example, shipping to and handling by an automobile manufacturer up until the time when modular EGR valves 10, 110 and 210 are attached to engine 80. The automobile or engine manufacture supplies bolts 64, 164, 264 and 65, 165, 265 to attach a respective metering subassembly 14, 114 and 214 to a corresponding actuator subassembly 12 and to attach modular EGR valves 10, 110 and 210 to a respective engine 80. The bolts provide the strength and durability required in the harsh, under the hood, automotive environment. Thus, eyelets 62-262 and 63-263 are constructed of relatively lightweight material and, therefore, are relatively inexpensive. Rivets 364 and 365 are relatively robust, and intended to provide structural support in the final assembly of modular EGR valve 310 to engine 80.

The above-described method of attachment provides substantial flexibility in the manufacture of modular EGR valves 10, 110, 210 and 310. Defective subassemblies are easily and quickly removed from modular EGR valves 10, 110, 210 and 310. Thus, only the defective subassembly is scrapped or repaired while the subassemblies in proper working condition remain in the production flow. Therefore, scrap is reduced and repair procedures are streamlined. Furthermore, the elimination of bolts and threaded joints yields benefits in the form of a reduction in the number of precise machining operations required to produce modular EGR valves 10, 110, 210 and 310. Therefore, modular EGR valves 10, 110, 210 and 310 are manufactured in a more expedient and efficient manner.

The attachment of a common actuator subassembly 12 to a variety of metering subassemblies 14, 114, 214, 314 reduces the number of different actuators which a manufacturer must stock. Thus, the inventory of component parts which a manufacturer must maintain is reduced, thereby lowering overhead costs and freeing up space in storage areas and/or manufacturing floors. Furthermore, the interchangeability of a common actuator subassembly 12 with a variety of metering subassemblies permits a single model of actuator to be used with a variety of engine models, further reducing overhead costs and freeing up space on the manufacturing floor.

In use, a particular metering subassembly, such as, for example, metering subassembly 14 is selected based upon the configuration of engine 80. The selected metering subassembly is coupled or attached to an actuator subassembly 12 to thereby form one of modular EGR valves 10, 110, 210 and 310. The process of assembling one of metering subassemblies 14, 114, 214 and 314 to a respective actuator subassembly 12, and the principles of operation of modular EGR valves 10, 110, 210 and 310 are sufficiently similar, that the process of assembly and principle of operation of EGR valve 10 is described hereinafter, said description being illustrative of each of modular EGR valves 10, 110, 210 and 310.

Modular EGR valve 10 is assembled by coupling metering subassembly 14 to actuator subassembly 12. Metering body mounting bores 56 and 58 are aligned with actuator mounting bores 37 and 38. Eyelets 62 and 63 are then inserted into actuator mounting bores 37, 38 and metering body mounting bores 56, 58, respectively, thereby coupling metering subassembly 14 to actuator subassembly 12. Thus, flange 42 is disposed within cavity 32 proximate to and aligned with actuator shaft 24. Actuator subassembly 12 selectively reciprocates actuator shaft 24 which, in turn, reciprocates metering shaft 40 and poppet 43. More particularly, reciprocation of actuator shaft 24 axially displaces actuator shaft 24 toward flange 42 of metering shaft 40. Actuator shaft 24 engages flange portion 42 of metering shaft 40. The axial reciprocation of actuator shaft 24 is transferred to metering shaft 40 which displaces enlarged end 55 of poppet 43 from sealing engagement with metering port 54. Thus, metering port 54 is opened and exhaust gas flows therethrough into metering chamber 52 and into the intake air stream of a piston or combustion chamber (not shown) of engine 80.

In the embodiment shown, actuator mounting bores 37 and 38 are cylindrical. However, it is to be understood that actuator mounting bores 37, 38 can be alternately configured, such as, for example, axial slots of a predetermined length and width to thereby enable the coupling of actuator subassembly 12 to an even greater variety of metering subassemblies. Furthermore, configuring actuator mounting bores 37, 38 as axial slots facilitates the concentric alignment of the actuator shaft with the metering shaft, thereby reducing friction and lowering the force necessary to reciprocate the actuator shaft and, in turn, the metering shaft and poppet.

In the embodiment shown, four illustrative and variously configured metering subassemblies 14, 114, 214 and 314 are coupled to a corresponding actuator subassembly 12 to thereby form a respective modular EGR valve 10, 110, 210 and 310 of the present invention. However, it is to be understood that metering subassemblies having different relative configurations of metering ports and metering chambers can be coupled to actuator subassembly 12 to thereby form additional embodiments of a modular EGR valve in accordance with the present invention.

While this invention has been described as having a preferred design, the present invention can be further modified within the spirit and scope of this disclosure. This application is therefore intended to cover any variations, uses, or adaptations of the invention using its general principles. Further, this application is intended to cover such departures from the present disclosure as come within known or customary practice in the art to which this invention pertains and which fall within the limits of the appended claims.

What is claimed is:

1. A modular EGR valve, comprising:

an actuator subassembly; and a selected one of a plurality of metering subassemblies, each of said plurality of metering subassemblies defining a metering port and a metering chamber, said metering port and said metering chamber having a plurality of different predetermine configurations, said selected one of said plurality of metering subassemblies configured for being coupled to said actuator subassembly and for being coupled to an engine.

2. The modular EGR valve of claim 1, wherein said actuator subassembly comprises a plurality of actuator subassemblies, each of said plurality of metering subassemblies configured for being coupled to each of said plurality of actuator subassemblies and for being coupled to a corresponding engine.

3. The modular EGR valve of claim 2, wherein each of said plurality of actuator subassemblies is substantially identical.

4. A modular EGR valve, comprising:

an actuator subassembly;

a metering subassembly, said metering subassembly defining a metering port and a metering chamber, said metering port and said metering chamber having a predetermined relative configuration, said metering subassembly configured for being coupled to said actuator subassembly and for being coupled to an engine;

said actuator subassembly comprises a plurality of actuator subassemblies, said metering subassembly comprises a selected one of a plurality of metering subassemblies, each of said plurality of metering subassemblies configured for being coupled to each of said plurality of actuator subassemblies and for being coupled to a corresponding engine; and said predetermined relative configuration of said metering port and said metering chamber comprises a plurality of different predetermined relative configurations, each of said plurality of metering subassemblies having a respective one of said plurality of predetermined relative configurations.

5. The modular EGR valve of claim 4, wherein said plurality of predetermined relative configurations includes a non-pressure balanced configuration.

6. The modular EGR valve of claim 4, wherein said plurality of predetermined relative configurations includes a pressure balanced configuration.

7. The modular EGR valve of claim 4, wherein said plurality of predetermined relative configurations includes a seat tube configuration.

8. The modular EGR valve of claim 4, wherein said plurality of predetermined relative configurations includes a ninety-degree configuration.

9. A metering subassembly for an EGR valve, comprising:

a selected one of a plurality of bodies, said selected one of a plurality of bodies defining a metering port and a metering chamber, said metering port and said metering chamber having a plurality of different predetermined configurations, said selected one of a plurality of bodies configured for being coupled to an actuator subassembly to thereby form the EGR valve, said selected one of a plurality of bodies configured for being coupled to an engine;

a poppet having a first poppet end and a second poppet end, said second poppet end biased in sealing engagement with said metering port; and a metering shaft having a first shaft end and a second shaft end, said first shaft end being disposed external to said selected one of a plurality of bodies, said second shaft end disposed proximate said first poppet end, said metering shaft configured for being selectively reciprocated by said actuator to thereby engage said first poppet end and reciprocate said poppet such that said second poppet end is disengaged from sealing engagement with said metering port.

10. The metering subassembly of claim 9, wherein said predetermined relative configuration comprises one of a non-pressure balanced configuration, a pressure balanced configuration, a seat tube configuration and a ninety-degree configuration.

11. The metering subassembly of claim 9, wherein said poppet is coupled to said metering shaft.

12. An actuator subassembly for an EGR valve, comprising:

an actuator body defining a cavity, said actuator body configured for being coupled to each of a plurality of metering subassemblies of different predetermined relative configurations, such that a metering shaft is disposed least partially within said cavity; and an actuator shaft disposed at least partially within said actuator body, said actuator selectively reciprocating said actuator shaft at least partially into said cavity.

13. An EGR valve, comprising:

an actuator subassembly; and a selected one of a plurality of metering subassemblies of different predetermined relative configurations, operably coupled to said actuator subassembly and configured for being coupled to a corresponding engine.

14. The EGR valve of claim 13, wherein said actuator subassembly is coupled to said selected one of said plurality of metering subassemblies by one of eyelets and rivets.

15. The EGR valve of claim 13, wherein said selected one of said plurality of metering subassemblies comprises:

a body, said body defining a metering port and a metering chamber, said metering port and said metering chamber having a predetermined relative configuration, said body configured for being coupled to the engine;

a poppet having a first poppet end and a second poppet end, said second poppet end normally disposed in sealing engagement with said metering port; and a metering shaft having a first shaft end and a second shaft end, said first shaft end being disposed external to said body, said second shaft end disposed proximate said first poppet end.

16. The EGR valve of claim 15, wherein said second shaft end is coupled to said first poppet end to thereby couple said metering shaft to said poppet.

17. The EGR valve of claim 15, wherein said actuator subassembly comprises:

an actuator body defining a cavity, said actuator being coupled to said metering subassembly, said metering shaft being disposed at least partially within said cavity; and an actuator shaft disposed at least partially within said actuator body, said actuator selectively reciprocating said actuator shaft into engagement with said metering shaft to thereby disengage said poppet from sealing engagement with said metering port.

18. An EGR valve, comprising:

an actuator subassembly; and a metering subassembly operably coupled to said actuator subassembly, said metering subassembly configured for being coupled to a corresponding engine;

said metering subassembly comprises a body, said body defining a metering port and a metering chamber, said metering port and said metering chamber having a predetermined relative configuration, said body configured for being coupled to the engine;

a poppet having a first poppet end and a second poppet end, said second poppet end biased in sealing engagement with said metering port;

a metering shaft having a first shaft end and a second shaft end, said first shaft end being disposed external to said body, said second shaft end disposed proximate said first poppet end;

said metering subassembly comprises a selected one of a plurality of metering subassemblies, each of said plurality of metering subassemblies having a respective and different said predetermined relative configuration.

19. The EGR valve of claim 18, wherein said predetermined relative configuration comprises one of a non-pressure balanced configuration, a pressure balanced configuration, a seat tube configuration and a ninety-degree configuration.

20. An engine, comprising:

a modular EGR valve having an actuator subassembly and a selected one of a plurality of metering subassemblies of different predetermined relative configurations, said selected one of a plurality of metering subassemblies being operably coupled to said actuator subassembly and to said engine.

21. A modular EGR valve, comprising:

an actuator subassembly;

a metering subassembly, said metering subassembly defining a metering port and a metering chamber, said metering port and said metering chamber having a predetermined relative configuration;

said metering subassembly comprises a selected one of a plurality of metering subassemblies, each of said plurality of metering subassemblies configured for being coupled to said actuator subassembly and for being coupled to a corresponding engine; and said predetermined relative configuration of said metering port and said metering chamber comprises a plurality of different predetermined relative configurations, each of said plurality of metering subassemblies having a respective one of said plurality of predetermined relative configurations.

* * * * *